United States Patent

Oki et al.

[11] Patent Number: 5,835,122
[45] Date of Patent: Nov. 10, 1998

[54] PRINTING APPARATUS AND METHOD CAPABLE OF SELECTIVELY PRINTING WITH A PLURALITY OF RESOLUTIONS

[75] Inventors: Joji Oki; Shinichiro Maekawa, both of Kawasaki, Japan

[73] Assignee: Canon Kabushiki Kaisha, Tokyo, Japan

[21] Appl. No.: 338,133

[22] Filed: Nov. 9, 1994

[30]     Foreign Application Priority Data

Nov. 12, 1993 [JP] Japan ................................. 5-282929
Nov. 1, 1994 [JP] Japan ................................. 6-268871

[51] Int. Cl.$^6$ .......................... B41J 2/47; G01D 15/14
[52] U.S. Cl. ....................... 347/251; 399/836; 358/298
[58] Field of Search ............................... 358/298, 335, 358/310, 133, 342; 395/102, 114, 842, 836, 200.76, 200.77, 200.38, 128, 164; 341/50, 60; 347/251

[56]           References Cited

U.S. PATENT DOCUMENTS

| | | | |
|---|---|---|---|
| 4,975,858 | 12/1990 | Ikenoue et al. | 347/129 |
| 5,241,659 | 8/1993 | Paurlski et al. | 345/508 |
| 5,315,693 | 5/1994 | Hirosawa | 395/102 |
| 5,400,057 | 3/1995 | Yin | 345/199 |
| 5,406,338 | 4/1995 | Tanaka | 351/136 |
| 5,406,383 | 4/1995 | Tanaka | 358/401 |
| 5,471,563 | 11/1995 | Dennis et al. | 395/114 |

FOREIGN PATENT DOCUMENTS

| | | |
|---|---|---|
| 0 387 039 | 9/1990 | European Pat. Off. . |
| 0 402 074 | 12/1990 | European Pat. Off. . |
| 0 428 370 | 5/1991 | European Pat. Off. . |
| 0 467 598 | 1/1992 | European Pat. Off. . |
| 0 539 135 | 4/1993 | European Pat. Off. . |
| 2 224 187 | 4/1990 | United Kingdom . |
| 2 250 844 | 6/1992 | United Kingdom . |

*Primary Examiner*—Benjamin R. Fuller
*Assistant Examiner*—Raquel Y. Gordon
*Attorney, Agent, or Firm*—Fitzpatrick, Cella, Harper & Scinto

[57]           ABSTRACT

In order to avoid a data underflow situation in a printing apparatus capable of generating second data such as bit map data from first data with a limited bit map memory capacity, the printing apparatus is provided with a discriminating unit for discriminating whether a memory for storing the second data can be secured, and a selecting unit for selecting either a first mode for generating the second data with a first resolving power or a second mode for generating the second data with a second resolving power lower than the first resolving power, according to the result of discrimination.

8 Claims, 12 Drawing Sheets

BAND TABLE

OBJECT TABLE

PRINTING APPARATUS AND METHOD CAPABLE OF SELECTIVELY PRINTING WITH A PLURALITY OF RESOLUTIONS

BACKGROUND OF THE INVENTION

1. Field of the Invention

The present invention relates to a printing apparatus for receiving input data from an information processing apparatus such as a host computer and generating and printing output data, and a printing method therefor.

2. Description of the Related Art

In a printing apparatus generating pixels by a scanning process, such as a laser beam printer, a full-raster image of the image to be printed has to be prepared in a bit map memory, prior to the printing operation. This is based on a fact that the page printing operation of the printing apparatus is conducted with the scanning process of a constant speed. Once the page printing operation is initiated, the printing process is conducted with a constant speed until said operation is completed. Consequently, in order to avoid a situation called data underflow, in which the data to be printed are deficient in the print engine, the entire image to be printed is converted into a raster image in the bit map memory prior to the printing operation. During the actual image printing operation, a CPU in the printing apparatus monitors the bit map memory and confirms that the raster image is supplied to the printer engine with the speed of the printing operation.

For printing a simple black-and-white image of a low resolving power, for example of 300 dot/inch (dpi), on a standard-sized sheet for example of 8½"×11" with such a printing system, there is required a bit map memory of about 1 megabyte (Mb). Since such memory of 1 Mb is inexpensive, it is not critical even if a major part of the memory is not used for a long time. The situation is the same also when the bit map memory has a capacity of 2 Mb, constituting a double buffer memory system. Such a double buffer system is preferable in that the image data of the current page can be printed from a buffer while the CPU prepares the raster image in the other buffer from the image data of a next page. Thus such a double buffer system allows continuously transfer of the raster image data to the printer engine, thereby improving the throughput in the page without significant increase in the cost.

On the other hand, for a resolving power of 600 dpi, there is required, for storing the full-raster image, a memory capacity of four times in comparison with the case of 300 dpi. Also an even larger memory capacity will be required for an intermediate-tone image or a color image. For example, for an intermediate-tone image with 16 density levels for each pixel, there is required a memory capacity of 4 bits per pixel. By multiplication of the memory capacity of 4 Mb required for storing the raster image of 600 dpi, there is obtained a memory capacity of 16 Mb required for storing the intermediate-tone raster image. A color image requires an even larger memory capacity. For example, in the case of four-color encoding for each pixel with 8 bits for each color, there are required 32 bits for each pixel. By multiplication of the memory capacity of 4 Mb required for storing the raster image of 600 dpi, there is obtained a memory capacity of 128 Mb required for storing the full-color raster image of 600 dpi. The cost of such large memory is not permissible for a commercial product. This cost problem becomes even more serious if the double buffer system is adopted for reducing the delay in time within the page.

For processing the input data of the resolving power of 600 dpi with the bit map memory of a limited capacity, there can be conceived a method of reducing the resolving power from 600 dpi to 300 dpi in generating the output data in the bit map memory.

Also for processing the input data of the resolving power of 600 dpi without the situation of data underflow, there may also be employed the method of reducing the resolving power from 600 dpi to 300 dpi in generating the output data in the bit map memory.

However such method, though enabling secure execution of the printing process, becomes associated with the deterioration of the printed image resulting from the reduction of the resolving power from 600 dpi to 300 dpi.

SUMMARY OF THE INVENTION

The object of the present invention is to provide a printing apparatus, and a method therefor, capable of bit map development with or without reduction in the resolving power according to the available capacity of the bit map memory.

The above-mentioned object can be attained, according to the present invention, by a printing apparatus comprising:

discrimination means for discriminating whether a memory capable of storing second data can be secures; and selection means for selecting either a first mode for generating second data from first data with a first resolving power or a second mode for generating second data from first data with a second resolving power lower than said first resolving power, according to the result of discrimination by said discrimination means.

The above-mentioned object can also be attained, according to the present invention, by a printing method comprising steps of:

discriminating whether a memory capable of storing second data can be secured; and selecting either a first mode for generating second data from first data with a first resolving power, or a second mode for generating second data from first data with a second resolving power lower than said first resolving power, according to the result of said discrimination.

Thus, according to whether a required memory can be secured, there is automatically selected the first mode (maintaining the resolving power) or the second mode (reducing the resolving power).

DESCRIPTION OF THE PREFERRED EMBODIMENTS

Prior to the explanation of the configuration of the present invention, there will at first be explained an example of the image output device in which the present invention is applicable.

Figure 1:
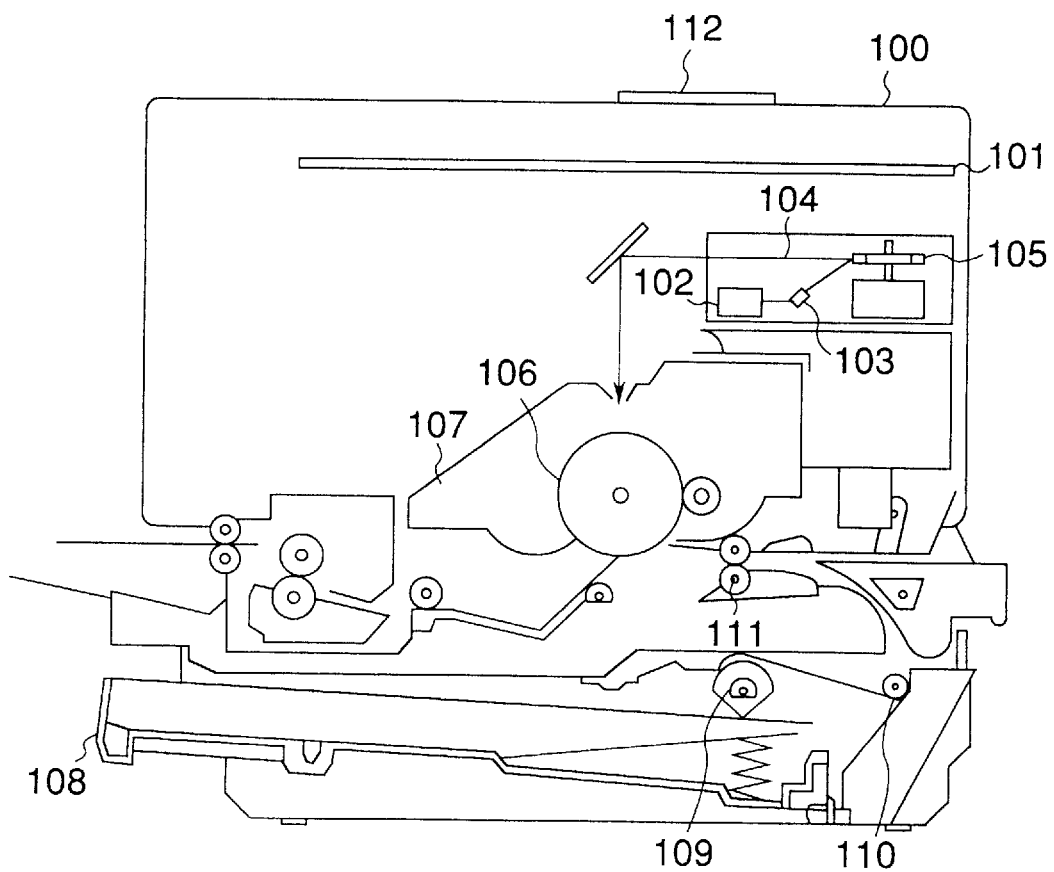
FIG. 1 is a cross-sectional view of a printing apparatus in which the present invention is applicable.

FIG. 1 is a cross-sectional view of an image output device, for example a laser beam printer, in which the present invention is applicable.

Figure 2:
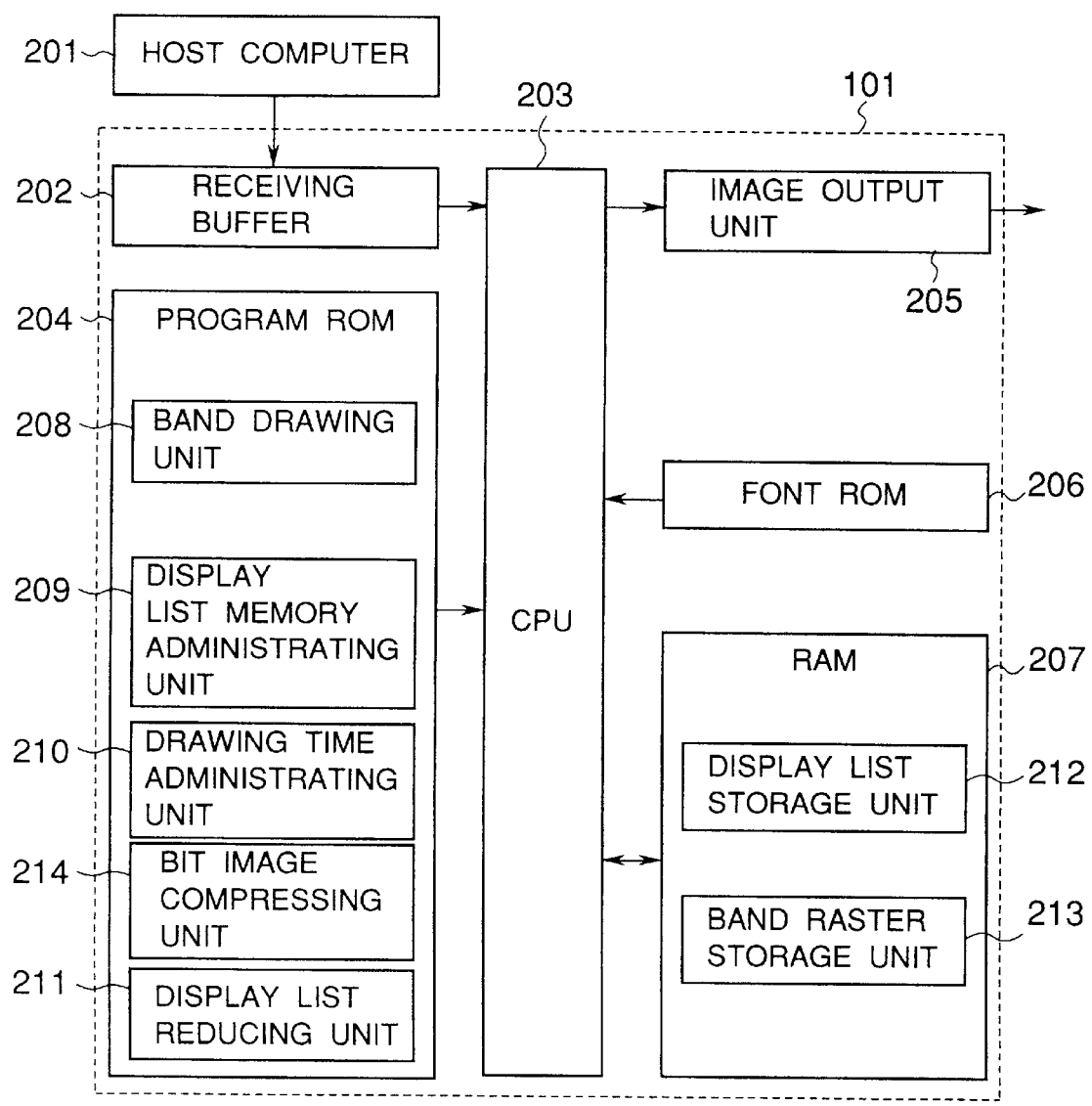
FIG. 2 is a block diagram of a printing apparatus constituting an embodiment of the present invention.

In FIG. 2 there is shown a main body 100 of the laser beam printer, which stores character information (character codes), format information and macro instructions received from an externally connected host computer 201 and generates character patterns and form patterns according to such information, thereby recording an image on a recording sheet constituting the recording medium. There are also provided an operation panel 112 equipped with operation switches, LED display devices etc., and a printer control unit 101 for controlling the entire main body 100 and analyzing the character information etc. supplied from the host computer. The printer control unit 101 principally converts the character information into a video signal of corresponding character patterns, for supply to a laser driver 102.

The laser driver 102, provided for driving a semiconductor laser 103, effects on-off control of the laser beam 104 emitted from the semiconductor laser 103, according to the input video signal. The laser beam 104 is deflected in the lateral direction by a rotary polygon mirror 105 and scans the surface of an electrostatic drum 106.

On the electrostatic drum 106 there is thus formed an electrostatic latent image of the character pattern, and the latent image is developed into a visible image by a developing unit 107 provided around the drum 106 and is transferred onto a recording sheet. Recording sheets of a cut sheet form are stored in a sheet cassette 108 mounted in the main body 100, and supplied to the electrostatic drum by means of a feed roller 109 and transport rollers 110, 111.

Figure 8:
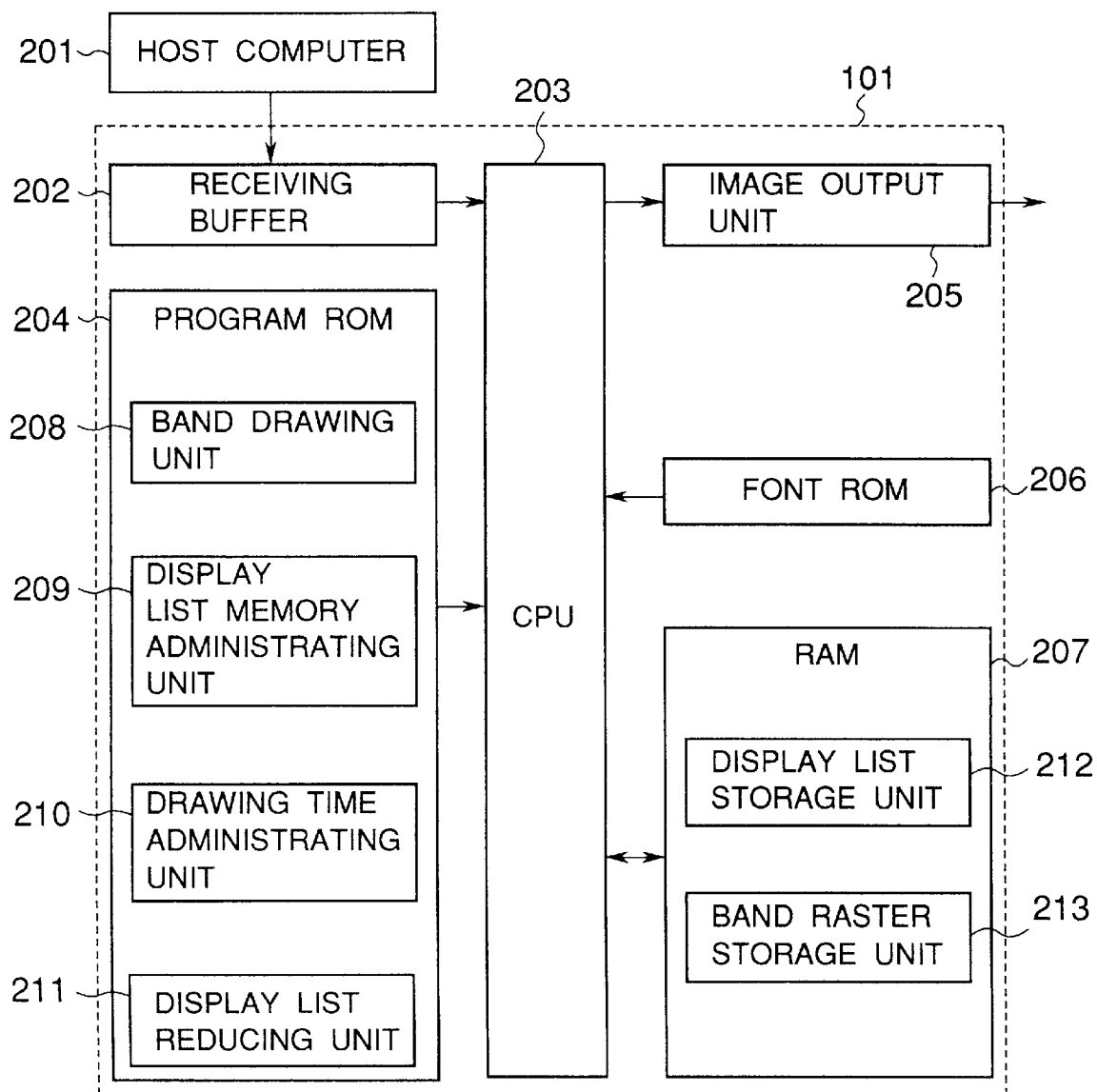
FIG. 8 is a block diagram of a printing apparatus constituting another embodiment of the present invention.

FIG. 8 is a block diagram showing the configuration of an image processing apparatus for achieving a secure printing process by reducing the resolving power.

Referring to FIG. 8, a host computer 201 is connected, through an unrepresented interface connector, with the control unit 101, which is so constructed as to effect the printing operation by receiving input data, consisting of commands and character codes, from the host computer 201. There are also provided a CPU 203 for effecting calculations and controls for an engine unit (not shown); a reception buffer 202 for temporarily storing the input data, consisting of commands and character codes, from the host computer 201; a program ROM 204 for storing programs for executing the control sequences to be explained later in relation to FIG. 9; a font ROM 206 for storing font scaler programs for generating character font patterns and outline fonts; a RAM 207 serving as a work area, a memory 212 for intermediate data (display list) and a memory 213 for output data (bit map data) in the program execution by the CPU 203; and an image output unit 205 for supplying the printer engine with the output data. The control unit 101 is powered by an unrepresented power source unit. The program ROM 204 stores, as processing programs, a band drawing unit 208, a display list memory administration unit 209, a drawing time administration unit 210, and a display list reduction unit 211.

Figure 9:
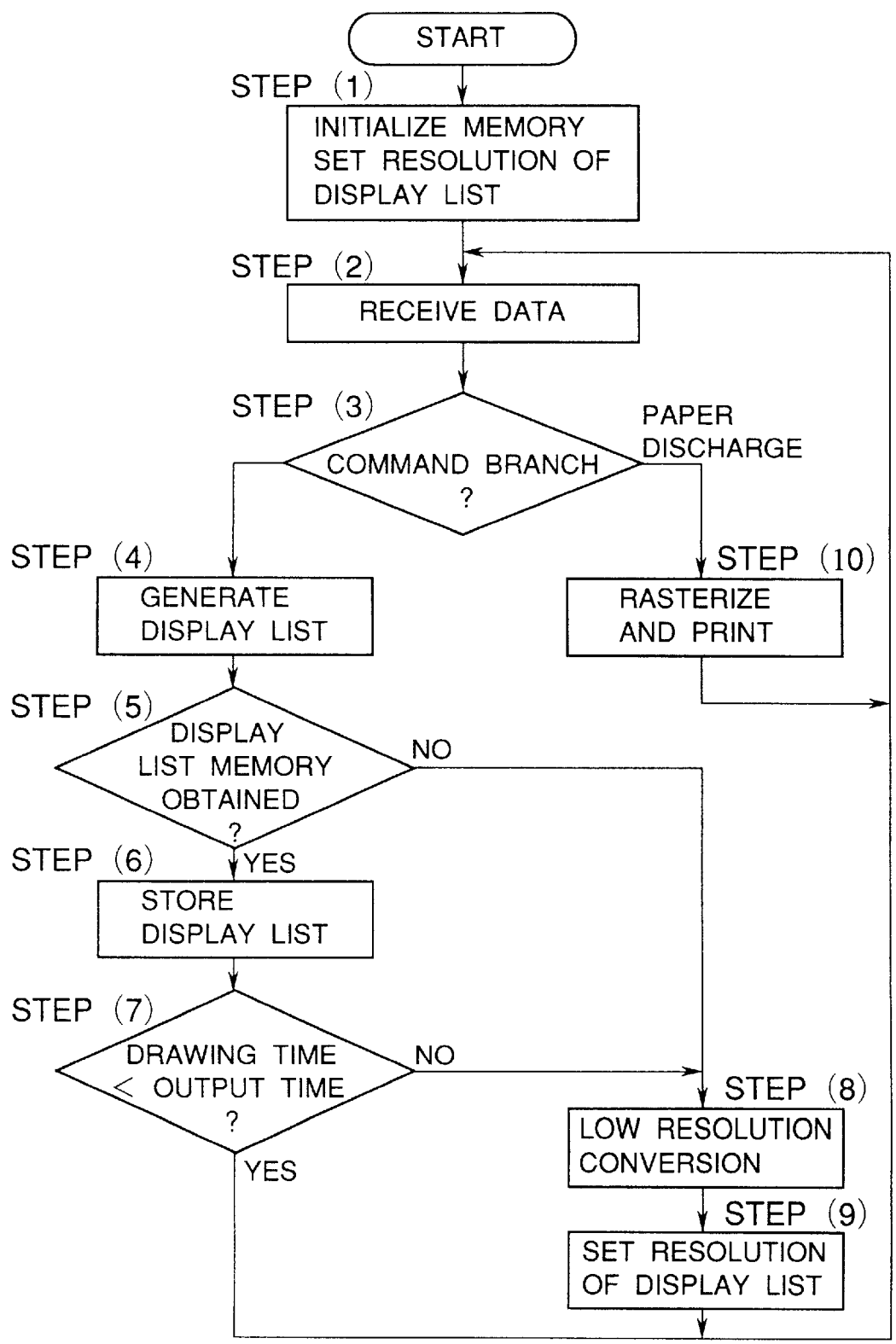
FIG. 9 is a flow chart showing an example of the image printing sequence for a RAM shown in FIG. 8.

FIG. 9 is a flow chart showing an example of the drawing process for the RAM 207 shown in FIG. 8, wherein parentheses (1)–(10) indicate process steps.

When the main body is powered, there are conducted initialization of a display list storage unit 212 and a band raster storage unit 213 and setting of the resolving power of the display list to be prepared in the step (4) (step 1). The structure of said display list storage unit 212 and band raster storage unit 213 will be explained later.

Then the input data are received from the host computer 201 (step 2), and are stored in the reception buffer 202, and data of a unit code are read therefrom. The received data are analyzed as a command (step 3), and a display list (intermediate data) of 600 dpi is generated from the command (step 4). Then the display list memory administration unit 209 discriminates whether a memory can be acquired from the display list storage unit 212 (step 5), and, if acquirable, the prepared display list is stored in the acquired memory (step 6). Subsequently the drawing time administration unit 210 predicts the time required for drawing the prepared display list in the band raster storage unit 213, and adds the time to a band administration table. Then there is discriminated whether the drawing time from the display list to the band raster is shorter than the output time from the band raster storage unit 213 to the image output unit (step 7), and, if shorter, the sequence returns to the step (2) to await the next data input.

On the other hand, if the step (7) identifies that the added drawing time is longer than the output time from the band raster storage unit 213 to the image output unit 205, the sequence proceeds to a step (8) to effect, in the display list reduction unit 211, the conversion of the resolving power of the object of 600 dpi in the already prepared display list to an object of 300 dpi (step 8), and the resolving power of the display list generated in the step (4) is set at 300 dpi (step 9). Subsequently the sequence returns to the step (2) to await the next data input. On the other hand, if the step (5) identifies that the memory is not acquirable, the sequence proceeds to the step (8).

In case of the conversion of resolving power in the step (8) from the 600-dpi object in the display list into the 300 dpi object, for example the character dot pattern of 600 dpi contained in the display list (intermediate data) of 600 dpi is subjected to a skipping process to generate a character dot pattern of 300 dpi.

In case the step (3) identifies a sheet discharge command, the display list is drawn, for each band, in the band raster storage area (step 10). In this operation, if the display list stored in the display list storage area is of 600 or 300 dpi, the drawing is executed respectively with the band raster selected at 600 or 300 dpi. The band raster after the drawing is supplied, by the image output unit 205, to the printer engine. The band raster storage unit 213 has a capacity of two bands, so that the drawing operation can be conducted in one band while the other is supplied to the printer engine.

In the following there will be explained, with reference to FIGS. 10 and 11, the structure of the display list storage unit 212 and the band raster storage unit 213 shown in FIG. 8.

Figure 10:
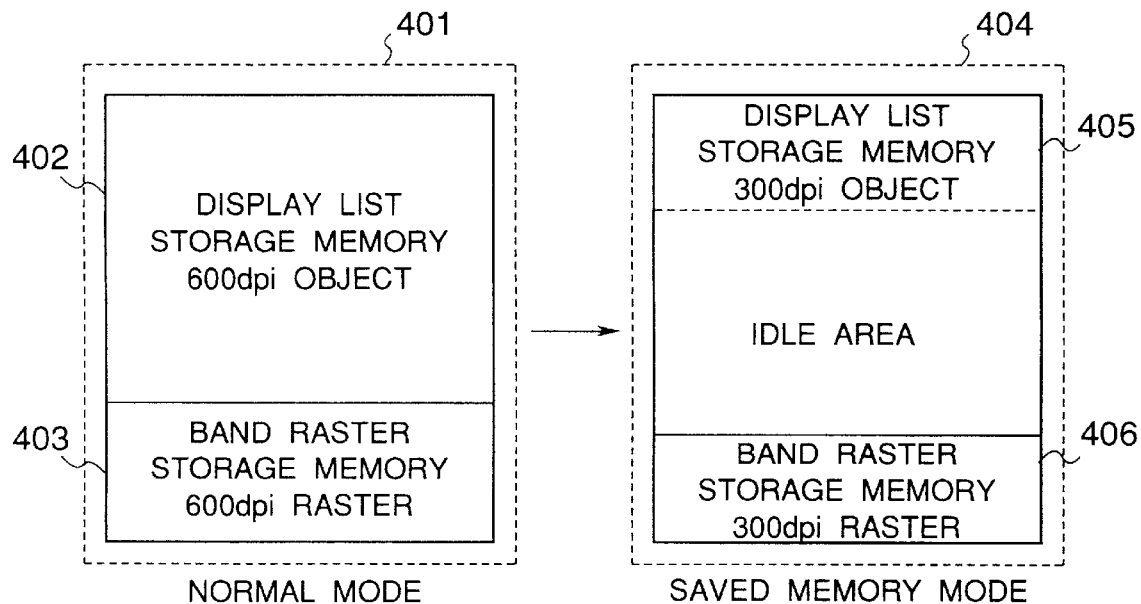
FIGS. 10 and 11 are schematic views showing the configuration of a display list and a band raster storage unit shown in FIG. 8.
Figure 11:
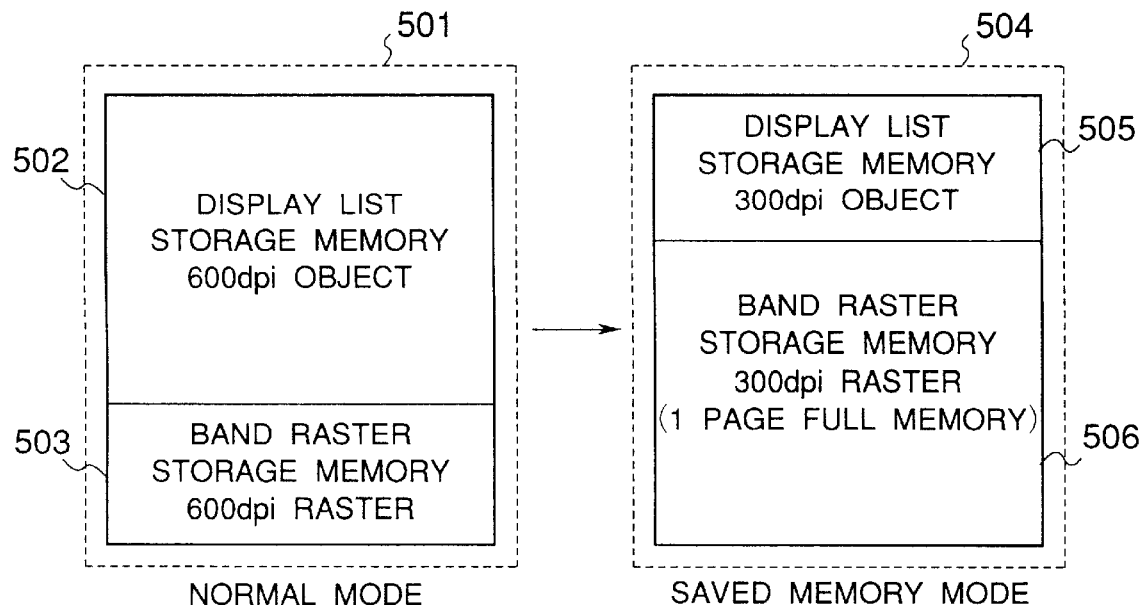

FIGS. 10 and 11 are schematic views showing the structures respectively of the display list storage unit 212 and the band raster storage unit 213 shown in FIG. 8.

Referring to FIG. 10, 401 indicates a normal memory state, in which a display list of 600 dpi is generated in a display list storage area 402. Also in the page discharging operation, the display list stored in the display list storage area 402 is drawn, for each band, in a band raster storage area 403 with a resolving power of 600 dpi.

404 indicates a memory state when the display list memory administration unit 209 identifies that the capacity of the display list is larger than a predetermined capacity, or when the drawing time administration unit 210 identifies that the drawing time required for drawing the display list in the band rasters is longer than a predetermined time.

The 600-dpi object in the display list storage area 402 in the normal state is converted, by the conversion of the resolving power to 300 dpi by the display list reducing unit 211, to a converted display list storage area 405. Also the band raster storage area 403 in the normal state is converted, in the resolving power from 600 dpi to 300 dpi, to a band raster storage area 406.

Through such resolving power conversion, an empty area is formed in the display list storage area 405. Also as the drawing time of the display list of 300 dpi is shorter than that of the display list of 600 dpi, it is possible, in the page discharging operation, to release the already drawn band rasters to the image output unit 205 while the display list, stored in the display list storage area 405, is drawn for each band in the band raster storage area 406 with a resolving power of 300 dpi.

On the other hand, after the latter memory state is reached, the display list generated by the display list generating operation is of 300 dpi.

Now referring to FIG. 11, 501 indicates a normal memory state, in which, in a display list storage area 502, a display list of 600 dpi is generated. Also in the band drawing (page output) operation, the display list stored in the display list storage area 502 is drawn with a resolving power of 600 dpi in a band raster storage area 503.

504 indicates a memory state when the display list memory administration unit 209 identifies that the capacity of the display list is larger than a predetermined capacity, or when the drawing time administration unit 211 identifies that the time required for drawing the display list in the band rasters is longer than a predetermined time.

Thus a 600-dpi object in the display list storage area 502 in the normal state is converted by the display list reducing unit 211 into a 300-dpi object, and is drawn in a band raster storage area 506 with a resolving power of 300 dpi.

In this manner the display list of 600 dpi in the display list storage area 502 is converted to 300 dpi and is all drawn in the band raster storage area 506.

However, if a raster area of a page cannot be secured in the initial band raster storage area 506, there is utilized an empty area secured by conversion of the display list storage area 502 to a lower resolving power or an empty area secured by drawing of the display list in the display list storage area 505 into the band raster storage area 506.

On the other hand, after the latter memory state is reached, the display list generation process generates a display list of 300 dpi, which is stored in the display list storage area 505.

Also after the latter memory state is reached, the prepared display list of 300 dpi may be directly drawn in the band raster storage area 506.

In the following there will be explained, with reference to FIGS. 12 and 13, the format of the display list and the raster development based on the display list.

Figure 12:
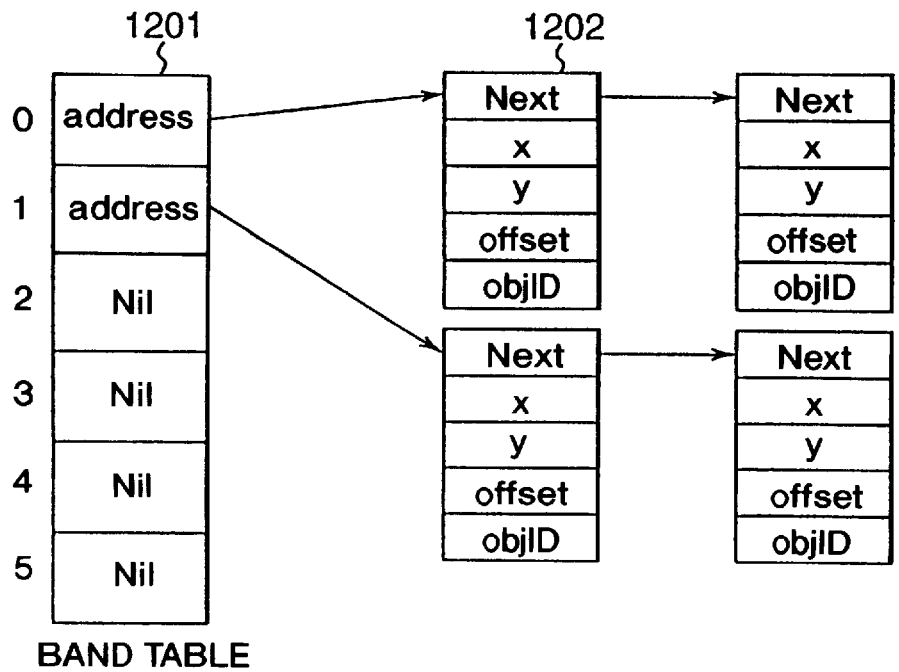
FIG. 12 is a view showing an example of the display list (intermediate data)
Figure 12:
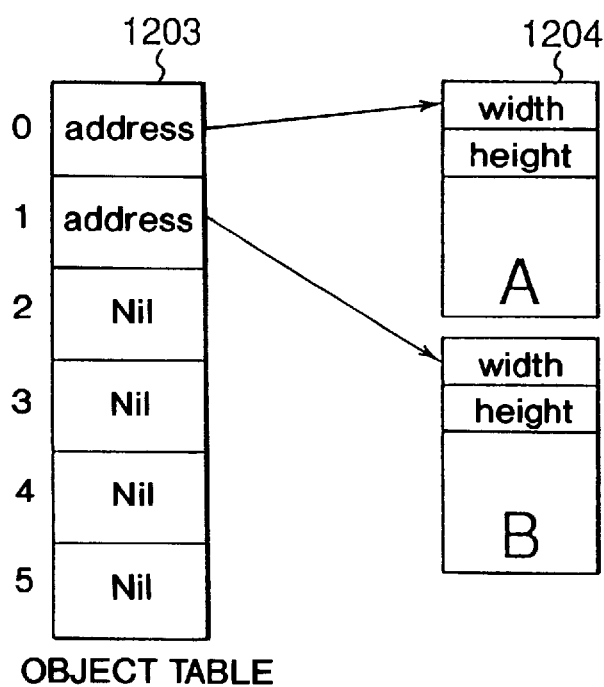

FIG. 12 shows an example of the display list in the image processing apparatus of the kind explained above. The display list (intermediate data) means a group of data (printer language consisting of character codes and control codes) received for example from the host computer and represented in a format easily convertible into bit map data in the printing apparatus.

Referring to FIG. 12, there are shown a band table 1201 for dividing a page into plural bands and administering the drawing object in each band; a drawing unit (application) 1202 for administering the print position of the actual drawing object; a drawing object (bit map, font) 1204; and an object table 1203 for administering the drawing objects. The display list means a list of the above-mentioned data 1201–1204.

The band table 1201 has application links to the bands. The application 1202 has a pointer to the next application, print positions X, Y in the band, an object number of the drawing object, and a scan line offset from the start of the drawing object to the print start position within the band. The object table 1203 has pointers to the drawing objects. The drawing object 1204 has the width and height of the object and a drawing bit map.

Figure 13:
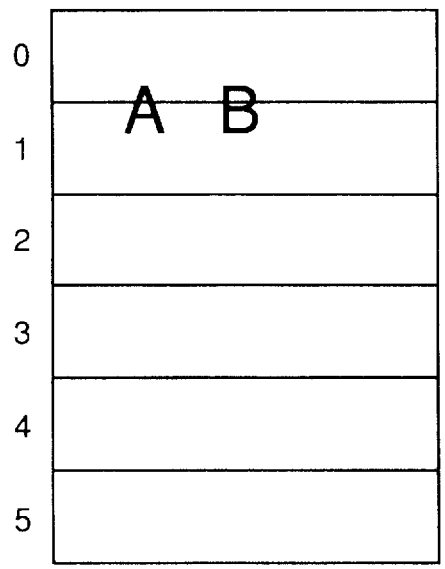
FIG. 13 is a schematic view showing an example of rasterizing development based on the display list shown in FIG. 12.

FIG. 13 is a schematic view of an example of the rasterized development based on the display list shown in FIG. 12.

As shown in FIG. 13, the application is developed in each band and drawn in rasterized format, thereby obtaining the output image in the raster memory.

FIG. 2 is a block diagram of the configuration of an image process apparatus capable of a secure printing operation without reduction in the resolving power, wherein like components as those in FIG. 8 are represented by like numbers.

Figure 4:
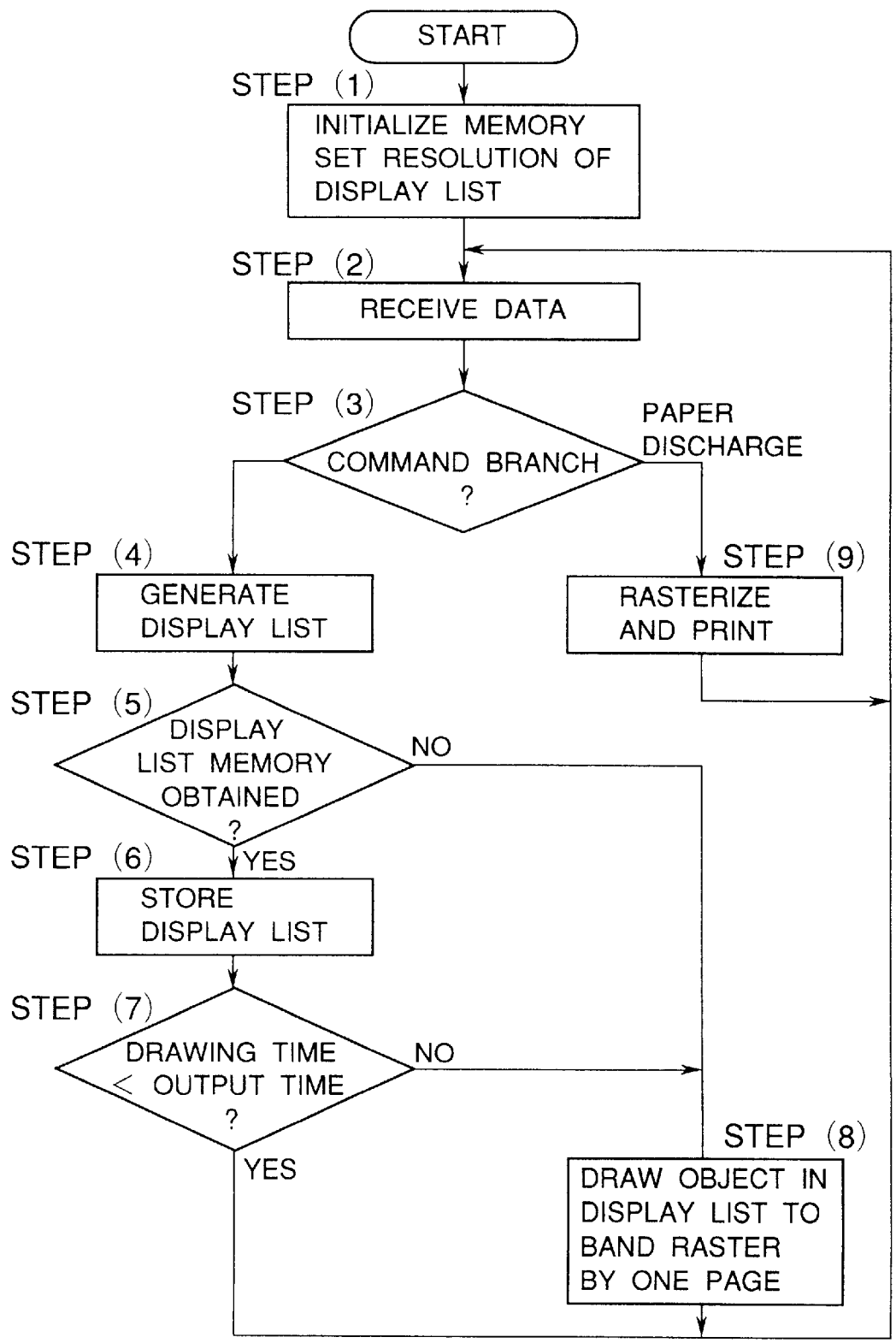
FIG. 4 is a flow chart showing an example of the image developing sequence in the printing apparatus of the present invention.

A CPU 203 controls the drawing development according to the sequence shown in FIG. 4, which is a flow chart of the image processing sequence to be executed in the image processing apparatus shown in FIG. 2, wherein (1) to (9) indicate process steps.

When the main body is powered, there are conducted initialization of the display list storage unit 212 and the band raster storage unit 213 and setting of the resolving power of the display list to be prepared in the step (4) (step 1). The structure of said display list storage unit 212 and band raster storage unit 213 will be explained later.

Then the input data are received from the host computer 201 (step 2), and are stored in the reception buffer 202, and data of a unit code are read therefrom. The received data are analyzed as a command (step 3), and display list of 600 dpi is generated from the command (step 4). Then the display list memory administration unit 209 discriminates whether a memory can be acquired from the display list storage unit 212 (step 5), and, if acquirable, the prepared display list is stored in the acquired memory (step 6). Subsequently the drawing time administration unit 210 predicts the time required for drawing the prepared display list in the band raster storage unit 213, and adds the time to a band administration table. Then there is discriminated whether the drawing time from the display list to the band raster is shorter than the output time from the band raster storage unit 213 to the image output unit (step 7), and, if shorter, the sequence returns to the step (2) to await the next data input.

On the other hand, if the step (7) identifies that the added drawing time is longer than the output time from the band raster storage unit 213 to the image output unit 205, the sequence proceeds to a step (8) to draw a page of the 600-dpi object in the already prepared display list, by the band drawing unit 208, in the band raster storage unit 606 without reduction of the resolving power (step 8). Subsequently the sequence returns to the step (2) to await the next data input. On the other hand, if the step (5) identifies that the memory is not acquirable, the sequence proceeds to the step (8). The details of step (8) will be explained later with reference to FIG. 14.

In case the step (3) identifies a sheet discharge command, the display list is drawn, for each band, in the band raster storage area (step 9).

Figure 3:
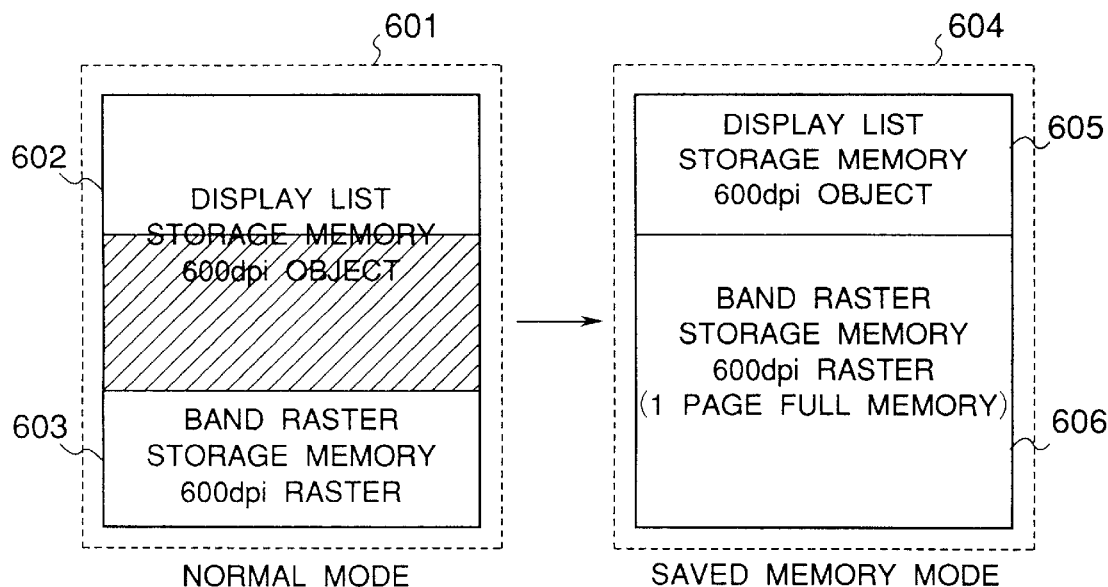
FIG. 3 is a schematic view showing a first memory map of a RAM shown in FIG. 2.

FIG. 3 is a schematic view showing a first memory map of the RAM 207 shown in FIG. 2.

601 indicates a normal memory state, in which a display list of 600 dpi is generated in a display list storage area 602. Also in the band drawing (page output) operation, the display list stored in the display list storage area 602 is drawn in a band raster storage area 603 with a resolving power of 600 dpi.

604 indicates a memory state when the display list memory administration unit 209 identifies that the capacity of the display list is larger than a predetermined capacity, or when the drawing time administration unit 210 identifies that the time required for drawing the display list in the band raster memory is longer than a predetermined time.

The 600-dpi object in the display list storage area 602 in the normal state is drawn with a resolving power of 600 dpi in the band raster storage area 606. In this manner the display list of 600 dpi in the display list storage area 602 is drawn, for a page amount, in the band raster storage area 606 without conversion of the resolving power.

However, in case the raster area of a page cannot be secured in the initial band raster storage area 606, there is utilized an empty area secured by drawing of the display list of the display list storage area 605 into the band raster storage area 606.

For example, a hatched empty area, made available by conversion of the display list in the hatched portion of the display list storage area 602 into bit map data and storage thereof in the band raster storage area 603, is assigned for the band raster storage area 606, whereby a memory area of a page is secured. Such operation is repeated to always secure the band raster storage area of a full page.

Also when the latter memory state (saved memory state) is reached, the display list generating operation prepares a display list of 600 dpi, which is stored in the display list storage area 605.

Also when the latter memory state is reached, the prepared display list of 600 dpi may be directly drawn in the band raster storage area 606.

In the foregoing description, the entire display list is drawn in the band raster storage area if the capacity of the display list is larger than a predetermined capacity or if the time of drawing of the display list into the band raster storage area is longer than a predetermined time. There may however be added an automatic switching function for the bit map memory according to the memory capacity in such a manner that, when the sun of the capacity of the display list storage area is small, a conversion to a lower resolving power from 600 dpi to 300 dpi is conducted by the display list reducing unit 211 and the display list of the lower resolving power in the display list storage area is drawn into the band raster storage area with a resolving power of 300 dpi if the display list memory administration unit 209 identifies that the capacity of the display list is larger than a predetermined capacity or if the drawing time administration unit 210 identifies that the time required for drawing the display list into the band rasters is longer than a predetermined time, and, when the sum of the capacity of the display list storage area 212 and the band raster storage area is larger, all the display list is drawn into the band rasters without reduction of the resolving power if the capacity of the display list is larger than a predetermined capacity or if the time required for drawing the display list into the band rasters is longer than a predetermined time.

Figure 15:
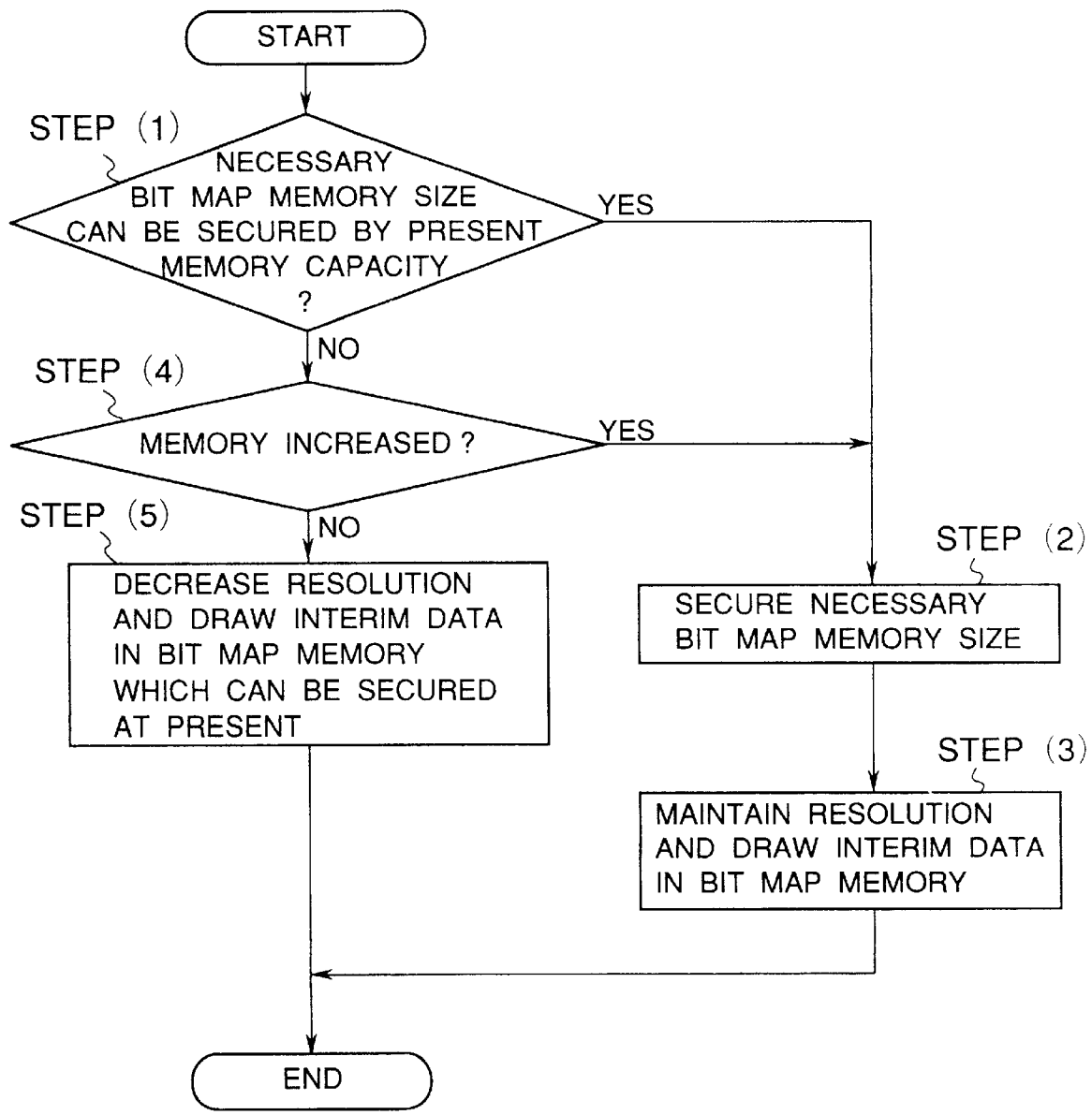
FIG. 15 is a flow chart showing auto switching function.

FIG. 15 is a flow chart showing the sequence of such automatic switching function. A corresponding program is stored in the program ROM 204 and is executed by the CPU 203.

In a step (1), the CPU 203 discriminates whether the required bit map memory (band raster storage area) can be currently secured in the RAM 207. For example there is discriminated whether a bit map memory, capable of storing bit map data of a designated sheet size, can be secured. If step (1) identifies that such bit map memory is securable, a step (2) secures the necessary bit map memory, and a step (3) draws the intermediate data in the thus secured bit map memory, with a maintained resolving power as already explained with reference to FIGS. 4 and 14, thereby generating bit map data.

On the other hand, if the step (1) identifies that the required bit map memory (band raster storage area) cannot be secured currently in the RAM 207, a step (4) discriminates whether an unrepresented expansion memory is connected, and, if connected, the process of the step (2) is executed. On the other hand, if the step (4) identifies that the memory is not expanded, a step (5) generates the bit map data by drawing the intermediate data in the currently securable bit map memory with a reduction of the resolving power from 600 dpi to 300 dpi as already explained in relation to FIG. 9.

Subsequently thus generated bit map data are released through the image output unit 205 and printed.

In this manner there are automatically switched, according to whether the bit map memory can be secured, a first mode of generating the bit map data with a retained resolving power and a second mode of generating the bit map data with a reduction of the resolving power.

Figure 5:
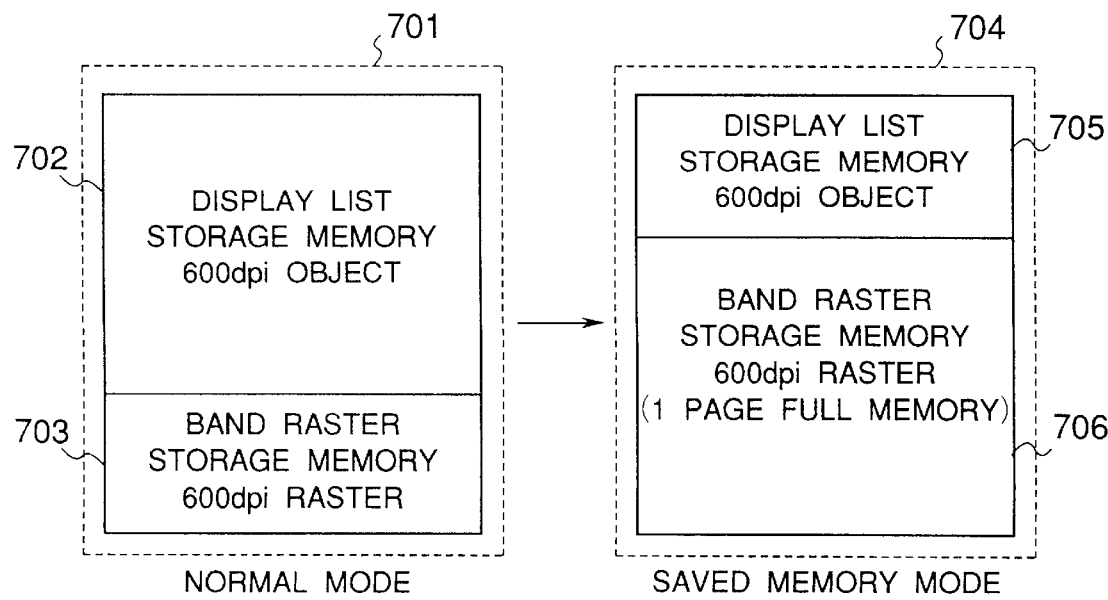
FIG. 5 is a schematic view showing a second memory map of the RAM shown in FIG. 2.

FIG. 5 is a schematic view showing the configuration of a second memory map in the RAM 207 shown in FIG. 2.

701 indicates a normal memory state in which a display list of 600 dpi is generated in a display list storage area 702. In the band drawing (page output) operation, the display list stored in the display list storage area 702 is drawn with a resolving power of 600 dpi in a band raster storage area 703.

704 indicates a memory state when the display list memory administration unit 209 identifies that the capacity of the display list is larger than a predetermined capacity or when the drawing time administration unit 210 identifies that the time required for drawing the display list in the band raster storage area is longer than a predetermined time.

The 600-dpi object in the display list storage area 702 in the normal state is successively drawn in a band raster storage area 706 with an unreduced resolving power of 600 dpi. In this manner the display list of 600 dpi in the display list storage area 702 is all drawn, for a page amount, into the band rasters 706 without the conversion to a lower resolving power, and the band rasters are stored after compression.

Thus the CPU 203a draws the display list in the band rasters and stores the drawn band rasters after compression, in case the capacity of the display list is larger than a predetermined capacity or in case the time required for drawing the display list in the band rasters is longer than a predetermined time. It is therefore rendered possible to securely prevent the drawing control means from conversion of the rasterized output image to a lower resolving power in the above-mentioned cases.

However, in case the raster area of a page cannot be secured in the initial band raster storage area 706, there is utilized an empty area secured by the drawing of the display list of the display list storage area 705 into the band raster storage area 706.

Even after the latter memory state is reached, the display list generation process prepares the display list with a resolving power of 600 dpi, and the prepared display list is stored in the display list storage area 705. After the latter memory state is reached, the prepared display list may be directly drawn in the band raster storage area 706.

Figure 14:
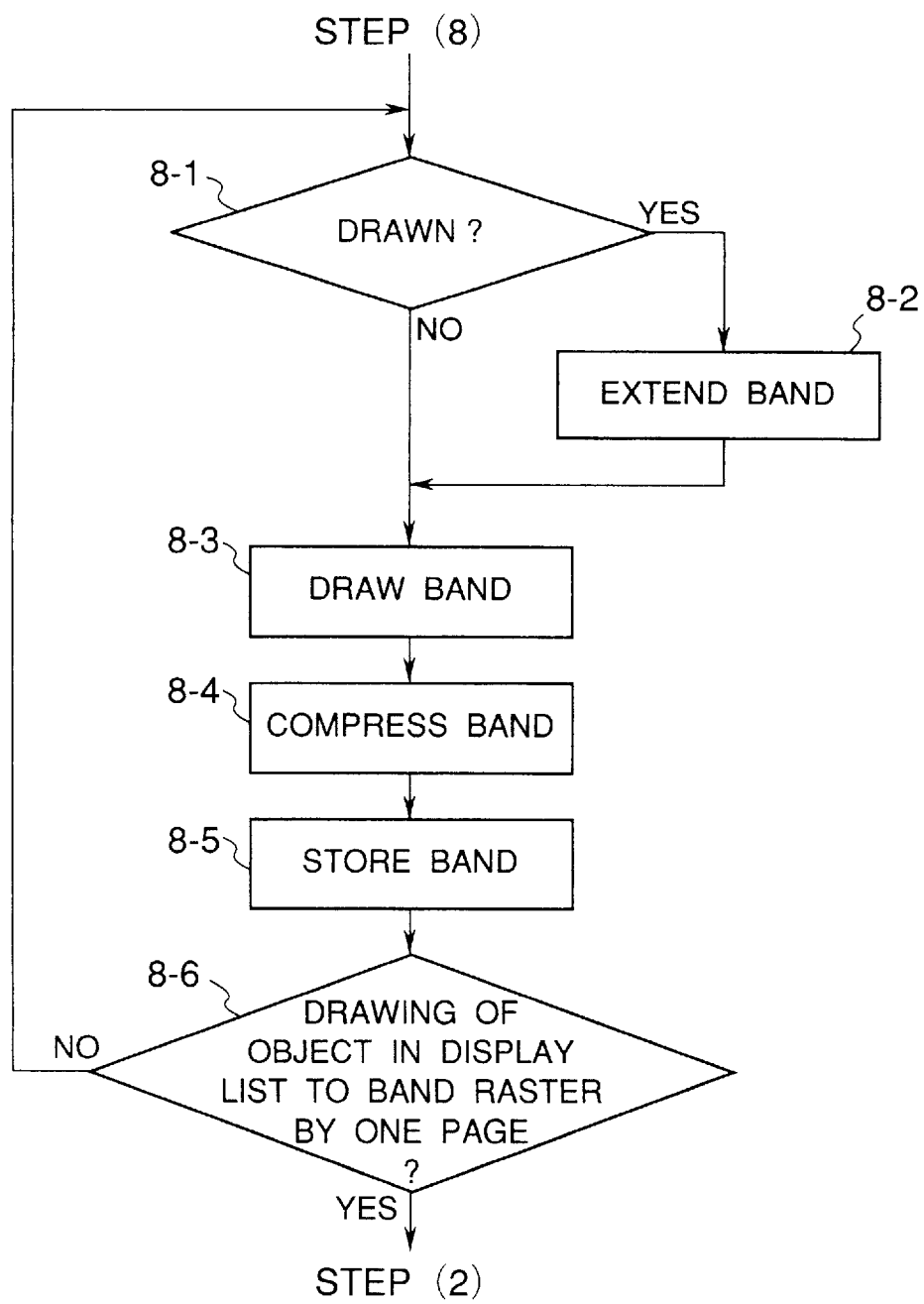
FIG. 14 is a flow chart showing the details of a step (8) in FIG. 4.

FIG. 14 is a flow chart showing the details of the step (8) in FIG. 4.

In a step 8-1, the CPU 203 discriminates whether a band area, containing an object to be drawn, has already been drawn. For example, in case of drawing the upper part of a character pattern B shown in FIG. 13 in a O band area, there is discriminated whether said O band area has already been drawn. If the step 8-1 identifies that the band area containing the object to be drawn has already been drawn, a step 8-2 expands the compressed data of said band area, and a step 8-3 draws (effecting bit map development) the object to be drawn, on thus expanded bit map data of said band area. For example, for drawing the upper part of the character pattern B shown in FIG. 13 in the O band area, the compressed data of the O band area, containing the compressed data of the upper part of the character pattern A, are expanded and the upper part of the character pattern B is drawn on thus expanded bit map data of the O band area.

On the other hand, if the step 8-1 identifies by the CPU 203 that the band area containing the object to be drawn has not yet been drawn, a step 8-3 draws said object, then a step 8-4 effects compression and a step 8-5 effects storage in the band raster storage area 213. Then a step 8-6 discriminates whether all the objects in the display list have been drawn, by a page amount, in the band rasters, and, if a page has been drawn, the sequence returns to the step (2), but if a page has not been drawn, the sequence returns to the step 8-1 for repeating the above-explained sequence.

Figure 6:
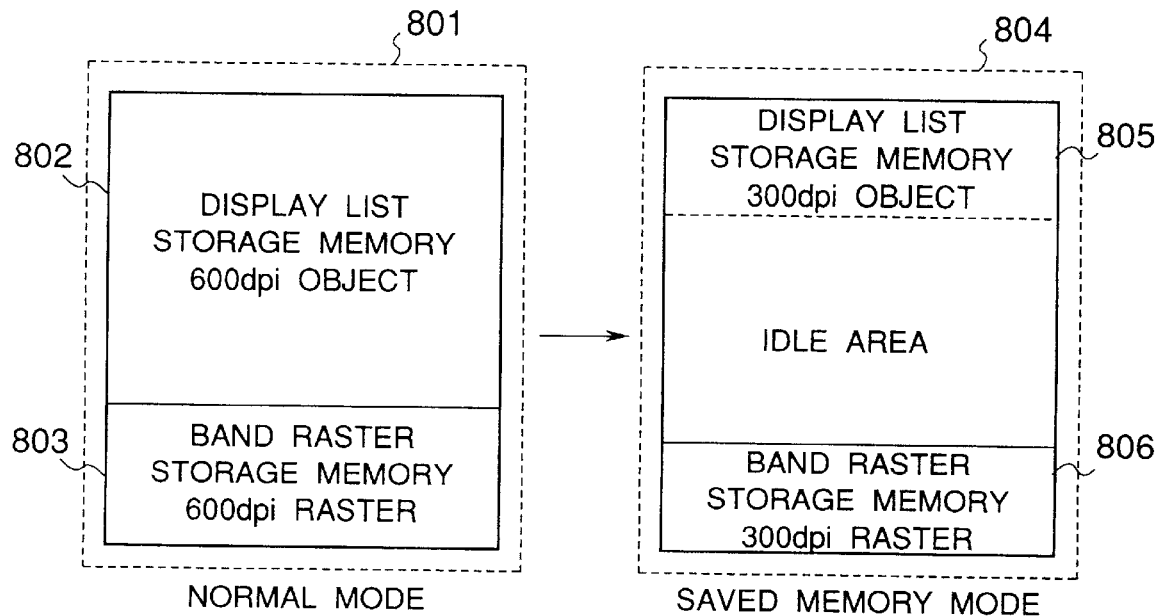
FIG. 6 is a schematic view showing a third memory map of the RAM shown in FIG. 2.

FIG. 6 is a schematic view showing the structure of a third memory map in the RAM 207 shown in FIG. 8.

801 indicates a normal memory state, in which a display list of 600 dpi is generated in a display list storage area 802. In the band drawing (page output) operation, the display list stored in the display list storage area 802 is drawn with a resolving power of 600 dpi in a band raster storage area 803.

804 indicates a memory state when the display list memory administration unit 209 identifies that the capacity of the display list is larger than a predetermined capacity, or when the drawing time administration unit 210 identifies that the time required for drawing the display list into the band rasters is longer than a predetermined time. The 600-dpi object in the display list storage area 802 in the normal state is re-generated as a 300-dpi object by the display list reducing unit 211, and drawing in the band raster storage area 806 is conducted with a resolving power of 300 dpi. In this manner the display list of 600 dpi in the display list storage area 802 is regenerated into 300 dpi, and is all drawn in the band raster storage area 806.

In the conversion of resolving power, in the step (8) in FIG. 9, from the object of 600 dpi in the display list into the object of 300 dpi, there will result deterioration of the image because the character dot pattern of 600 dpi, for example, contained in the display list (intermediate data) of 600 dpi is subjected to a skipping process for obtaining the character dot pattern of 300 dpi. On the other hand, the above-mentioned regeneration process means generation, by means of a font scaler (program) in the font ROM 206, of a character pattern of 300 dpi size, the same as the character pattern of 600 dpi contained in the 600-dpi object. Consequently, even with the reduction of the resolving power from 600 dpi to 300 dpi, the character pattern of 300 dpi is generated anew, without the skipping process of the original character pattern, so that there can be generated and printed the output data of 300 dpi of a high quality.

For this purpose the font object in the display list storage area 802 is given, in advance by the CPU 203, certain information such as font ID and character code capable of re-scaling, and the CPU 203 can generate and print output data (bit map data) of 300 dpi of high quality, based on said information.

In this manner the CPU 203 regenerates the display list of a lower resolving power from the information of the original display list and stores said regenerated display list in the display list storage area 212, in case the capacity of said display list is larger than a predetermined capacity or in case the time required for drawing the display list in the band rasters is longer than a predetermined time, so that the deterioration in the image quality can be minimized.

However if the raster area of a page cannot be secured in the initial band raster storage area 806, there is utilized an empty area secured by the regeneration, with a lower resolving power, of the display list in the display list storage area 802, or an empty area secured by the drawing of the display list in the display list storage area 805 into the band raster storage area 806.

After the latter memory state is reached, the display generation process prepares a display list of 300 dpi, and the prepared display list is stored in the display list storage area 805.

Also after the latter memory state is reached, the prepared display list of 300 dpi may be directly drawn in the band raster storage area 806.

Figure 7:
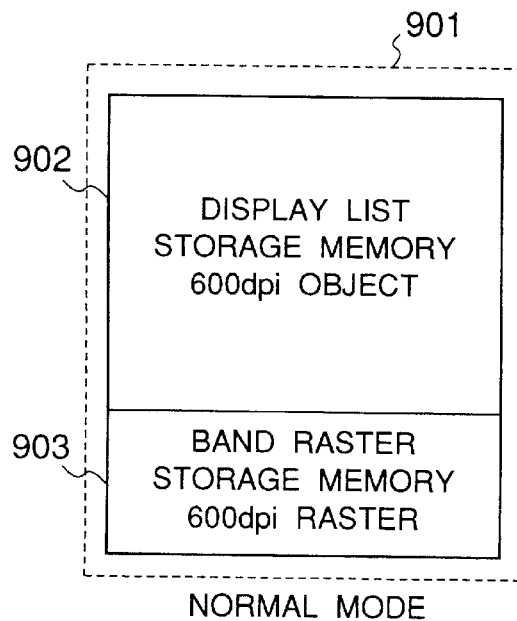
FIG. 7 is a schematic view showing a fourth memory map of the RAM shown in FIG. 2.

FIG. 7 is a schematic view showing the configuration of a fourth memory map in the RAM 207 shown in FIG. 2.

In a memory state 901, a display list of 600 dpi is generated in a display list storage area 902. If the display list belongs to a band 1 or 2, it is drawn by the band drawing unit and is stored in the band raster storage area 903. If the display list does not belong to the band 1 nor 2, it is stored in the display list storage area 902. In the band drawing (page output) operation, if the display list belongs to the band 1 or 2, the image is supplied directly from the band raster storage area 903 to the image output unit 205. If the display list does not belong to the band 1 nor 2, the display list stored in the display list storage area 902 is drawn in the band raster storage area 903 with a resolving power of 600 dpi and the image is supplied to the image output unit 205.

In this manner the CPU 203 can draw and store arbitrary bands of the display list into the band raster storage area, so that the frequency of lower resolving power can be reduced.

In the foregoing embodiments, there has been explained a laser beam printer as an example of the image output unit 205 in which the present invention is applicable, but it is naturally applicable to the printers of other printing methods, for example an ink jet printer.

Besides the present invention is applicable to a system consisting of plural equipment, or to an apparatus consisting of a single equipment. Furthermore, the present invention is naturally applicable also to a case in which the present invention is achieved by the supply of a program to a system or an apparatus.

What is claimed is:

1. A printer control apparatus comprising:

conversion means for converting data received from an external apparatus into intermediate data;

generation means for generating bit map data based on the intermediate data converted by said conversion means; and discrimination means for discriminating whether printing is executable for bit map data generated with a first resolution, said conversion means comprising:

first conversion means for converting the received data into a first type of intermediate data; and second conversion means for, without generating bit map data, converting the first type of intermediate data converted by said first conversion means into a second type of intermediate data when said discrimination means discriminates that printing is unexecutable for bit map data generated with the first resolution, wherein said generation means generates one of (a) bit map data with the first resolution based on the first type of intermediate data, and (b) bit map data with a second resolution, different from the first resolution, based on the second type of intermediate data.

2. A printer control apparatus according to claim 1, said first conversion means converting the received data into the first type of intermediate data corresponding to a plurality of bands forming one page, during printing of bit map data corresponding to one of the plurality of bands, said generation means generating bit map data based on the first type of intermediate data corresponding to another one of the plurality of bands, and said discrimination means discriminating that the printing is unexecutable for bit map data generated with the first resolution when at least one of (a) an estimation that a real-time conversion by said first conversion means is unexecutable, and (b) a memory space cannot be reserved for storing the first type of intermediate data, occurs.

3. A printer control apparatus according to claim 1, said first conversion means converting the received data into the first type of intermediate data corresponding to a plurality of bands forming one page, during printing of bit map data corresponding to one of the plurality of bands, said generation means generates bit map data based on the first type of intermediate data corresponding to another one of the plurality of bands, and in response to said discrimination means discriminating that printing is unexecutable for bit map data generated with the first resolution, said generation means generates one of (a) bit map data based on the second type of intermediate data corresponding to another one of the plurality of bands during printing of bit map data corresponding to one of the bands, and (b) generates one page of bit map data prior to starting printing.

4. A printer control apparatus according to claim 1, the first type of intermediate data including re-scaling data required to re-scale a character pattern and said second conversion means generating a character pattern based on the re-scaling data.

5. A printer control method comprising the steps of:

converting data received from an external apparatus into intermediate data;

generating bit map data based on the intermediate data converted in said converting step; and discriminating whether printing is executable for bit map data generated with a first resolution, said converting step comprising the steps of:

converting the received data into a first type of intermediate data; and converting, without generating bit map data, the first type of intermediate data, converted in said step of converting the received data, into a second type of intermediate data when said discriminating step discriminates that printing is unexecutable for bit map data generated with the first resolution, wherein said generating step generates one of (a) bit map data with the first resolution based on the first type of intermediate data, and (b) bit map data with a second resolution, different from the first resolution, based on the second type of intermediate data.

6. A printer control method according to claim 5, wherein, in said step of converting the received data into the first type of intermediate data, the first type of intermediate data corresponds to a plurality of bands forming one page, wherein, during printing of bit map data corresponding to one of the plurality of bands, the bit map data generated in said generating step corresponds to another one of the plurality of bands, and wherein said discriminating step discriminates that printing is unexecutable for bit map data generated with the first resolution when at least one of (a) an estimation that a real-time conversion by said step of converting the received data into the first type of intermediate data is unexecutable, and (b) memory space cannot be reserved for storing the first type of intermediate data, occurs.

7. A printer control method according to claim 5, wherein, in said step of converting the received data into the first type of intermediate data, the first type of intermediate data corresponds to a plurality of bands forming one page, wherein, during printing of bit map data corresponding to one of the plurality of bands, the bit map data generated in said generating step corresponds to another one of the plurality of bands, and wherein, in response to said discriminating step discriminating that printing is unexecutable for bit map data generated with the first resolution, said generating step generates one of (a) bit map data based on the second type of intermediate data corresponding to another one of the plurality of bands during printing of bit map data corresponding to one of the bands, and (b) generates one page of bit map data prior to starting printing.

8. A printer control method according to claim 5, the first type of intermediate data including re-scaling data required to re-scale a character pattern, and said step of converting the first type of intermediate data into a second type of intermediate data generates a character pattern based on the re-scaling data.

* * * * *

UNITED STATES PATENT AND TRADEMARK OFFICE
CERTIFICATE OF CORRECTION

PATENT NO. : 5,835,122
DATED : November 10, 1998
INVENTOR(S) : Oki et al.

It is certified that error appears in the above-identified patent and that said Letters Patent is hereby corrected as shown below:

COLUMN 1:

Line 41, "continuously" should read --continuous--.

COLUMN 2:

Line 23, "secures;" should read --secured;--.

COLUMN 7:

Line 62, "sun" should read --sum--.

Signed and Sealed this

Twenty-ninth Day of June, 1999

Attest:

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,835,122
DATED : November 10, 1998
INVENTOR(S) : JOJI OKI, ET AL.

It is certified that error appears in the above-identified patent and that said Letters Patent is hereby corrected as shown below:

ON THE COVER PAGE AFTER ASSIGNEE

Add --[*] Notice: This patent issued on a continued prosecution application filed under 37 CFR 1.53(d), and is subject to the twenty year patent term provisions of 35 U.S.C. 154(a)(2).--.

Signed and Sealed this

Twelfth Day of September, 2000

Attest:

Q. TODD DICKINSON

*Attesting Officer*     *Director of Patents and Trademarks*